United States Patent [19]
Miller

[11] 3,723,848

[45] Mar. 27, 1973

[54] ELECTRICAL POWER INVERTER WITH SINUSOIDAL OUTPUT

[75] Inventor: Edward J. Miller, Littleton, Colo.

[73] Assignee: Martin Marietta Corporation, Washington, D.C.

[22] Filed: Apr. 17, 1972

[21] Appl. No.: 244,690

[52] U.S. Cl.............321/45 R, 331/113 A, 331/117
[51] Int. Cl......H02m 7/52, H03k 3/281, H03b 5/00
[58] Field of Search.......321/45 R, 45 C; 331/113 A, 331/117

[56] References Cited

UNITED STATES PATENTS

| | | |
|---|---|---|
| 2,971,166 | 2/1961 | Schultz...........................331/113 A |
| 3,196,335 | 7/1965 | Williams....................................321/2 |
| 3,348,124 | 10/1967 | Cielo................................321/45 C |
| 3,663,944 | 3/1971 | Low...................................321/45 R |
| 3,289,067 | 11/1966 | Pinckaers..........................321/45 R |

Primary Examiner—William H. Beha, Jr.
Attorney—Phillip L. De Armnet et al.

[57] ABSTRACT

An improved inverter circuit developing sinusoidal output signals in response to dc input signals without the use of filters external to the inverter circuit. The inverter includes a commutator transformer and resonant circuit in the primary side of a load transformer. Periodic inverting of the dc signal is accomplished using switching transistors and a feedback transformer coupled to the commutator transformer and resonant circuit through the primary of the load transformer.

10 Claims, 2 Drawing Figures

ELECTRICAL POWER INVERTER WITH SINUSOIDAL OUTPUT

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Various types of dc to ac power inverters are known to those skilled in the power converter art. These inverters can be classified into two groups, those which generate a rectangular output waveform and those which generate a sinusoidal waveform. Two types of dc to sinusoidal output inverters are common. In the first type, the inverter is basically a dc to rectangular output device with external filters used to convert the rectangular output waveform to a sinusoidal waveform. In the second type of dc to sinusoidal ac inverter, no external filtering means are used, the inverter itself generating a sinusoidal output. This latter type of inverter is a true dc to sinusoidal inverter and will be termed herein a sine wave inverter as opposed to a rectangular inverter. Sine wave inverters use a resonant circuit which aids in the switching of the switching transistors to periodically invert the input dc signal and also acts as a filter. Because of the resonant circuit, all frequencies but the resonant frequency is inhibited from the output. Examples of such sine wave inverters can be found in the patents to Schultz, U.S. Pat. No. 2,971,166 and Roesel, U.S. Pat. No. 2,965,856.

Sine wave inverters have a higher efficiency than rectangular wave inverters with an output filter used to convert the rectangular waveform to a sine wave. In addition, sine wave inverters are generally less expensive than rectangular wave inverters with external filters due to an economy in the use of circuit elements. However, within my knowledge, all prior sine wave inverters utilize the resonant circuit in series or in parallel with the load and therefore the frequency of the output wave is to a large extent controlled by the load. Further, such a design permits the use of only a single load.

There is also known in the prior art a rectangular inverter which uses a resonant circuit to determine the frequency of the rectangular output waveform. Such a rectangular waveform inverter circuit is exemplified by the patent to Relation et al., U.S. Pat. No. 2,962,667. In the Relation patent, a sine wave current is supplied to the bases of switching transistors to control the frequency of the output rectangular waveform. A portion of the sine wave current also flows in the primary of a load transformer. However, this sine wave current is extremely small and insignificant when compared to the rectangular current supplied to the primary of the load transformer through the dc input source and the collector-emitter circuits of the switching transistors.

SUMMARY OF THE INVENTION

The present invention is an improved dc to sine wave inverter of the type using a resonant circuit to accomplish switching of the inverter switching elements while acting as a filter to inhibit all but the resonant frequency from the output. The inventive inverter set forth in detail hereinbelow, provides frequency stability in that the frequency of the output waveform is made essentially independent of the load. Such independence is made possible by locating the resonant circuit on the primary side of the load transformer. The sine wave inverter includes a commutator transformer and resonant circuit on the primary side of the load transformer. Switching elements in the form of transistors are periodically switched to periodically invert the input dc signal. Due to the action of the resonant circuit, only sinusoidal current flows through the primary side of the load transformer thereby presenting a sine wave output to the load which is coupled to the secondary of the load transformer. Since frequency determining elements are located on the primary side of the load transformer, the secondary of the load transformer may be comprised of a plurality of secondary windings a plurality of loads being coupled to the secondary windings. Transistor switching is accomplished in response to a current reversal in the commutator and load transformers by means of a feedback transformer, the secondary windings of which are connected to the base-emitter circuits of the switching transistors.

DETAILED DESCRIPTION OF THE PREFERRED EMBODIMENTS

Figure 1:
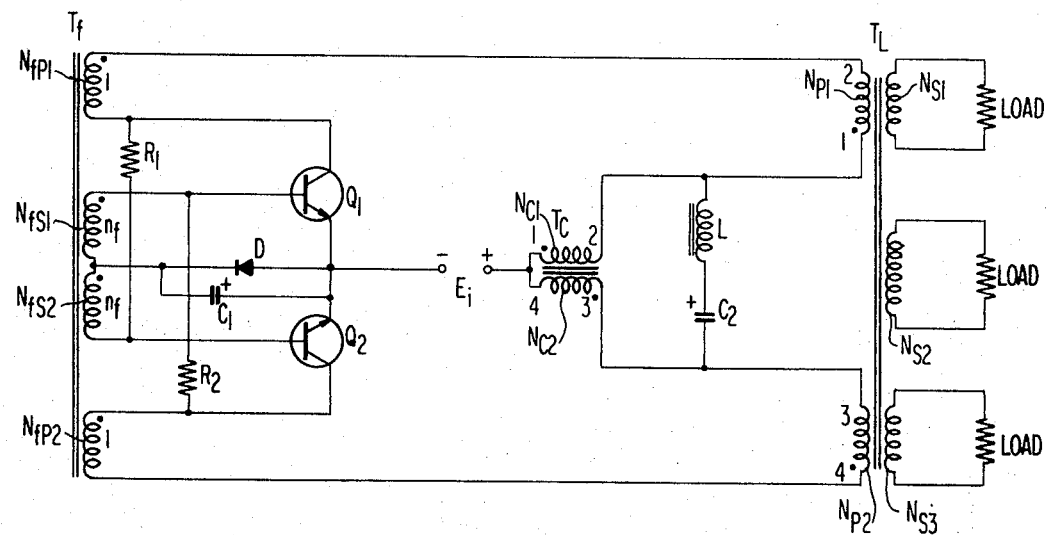
FIG. 1 is a circuit diagram of the sine wave inverter of the present invention.
Figure 2:
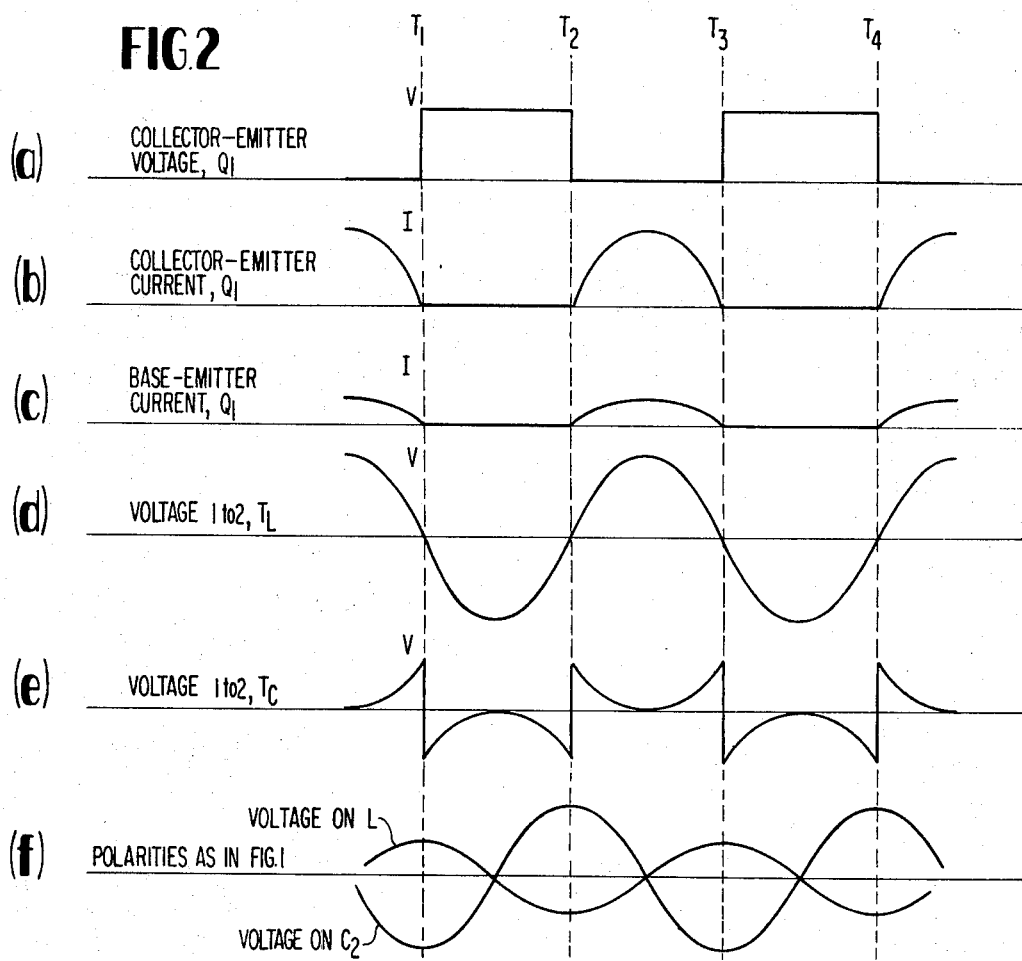
FIG. 2 illustrates waveforms appearing at various points of the circuit of FIG. 1 during its operation.

The sine wave inverter of the present invention will now be described in detail with reference to FIGS. 1 and 2. FIG. 1 is a circuit diagram of the sine wave inverter while FIG. 2 represents current and voltage waveforms appearing at various points in the circuit during its operation.

The inverter includes a dc source $E_1$, the positive polarity terminal of which is connected to the common point of serially connected windings $N_{c1}$ and $N_{c2}$ of a commutator transformer $T_c$. A series resonant circuit including inductor L and capacitance $C_2$ is coupled in parallel across the series connected windings of the commutator transformer $T_c$. The first and second primary windings $N_{p1}$ and $N_{p2}$ of a load transformer $T_L$ are serially connected to the parallel combination of the resonant circuit and commutator transformer. The load transformer has a plurality of secondary windings $N_{s1}$ – $N_{s3}$ each coupled to a load. The load transformer will preferably be a voltage step-up transformer for the reasons more fully described hereinbelow.

In series with the primary windings of the load transformer are the primary windings $N_{fp1}$ and $N_{fp2}$ of a feedback transformer $T_f$. The secondary windings $N_{fs1}$ and $N_{fs2}$ of the feedback transformer are coupled respectively between the base-emitter circuits of switching transistors Q1 and Q2. Resistors R1 and R2 as well as diode D and capacitor $C_1$ form a conventional starting circuit which operates to turn on either Q1 or Q2 when source $E_t$ is switched into the circuit and subsequently aids in the switching of transistors Q1 and Q2 in response to operation of the commutator transformer $T_c$ and the resonant circuit.

Although the arrangement of the circuit elements including transistors $Q_1$ and $Q_2$, the feedback transformer $T_f$ and the starting circuit are conventional, a short description of their operation will be given in order to aid the reader in understanding the operation of the present invention. When the source $E_t$ is switched into the circuit, current flows in the resistors $R_1$ and $R_2$, presenting a positive bias to the base of both transistors $Q_1$ and $Q_2$. Due to an inherent unbalance between these transistors, one of the transistors will turn on forcing the other transistor to remain off. Switching is accomplished by changing the direction of current flow in the primary windings of the feedback transformer. When this occurs, the collector potential of the on transistor drops tending to turn off that transistor. Capacitor $C_1$ has previously charged to present a negative bias to the base of the on transistor thus aiding in its turn-off action. Simultaneously, as the on transistor turns off, a greater proportion of the current originally flowing through the on transistor now flows through the resistor coupled between its collector and the base of the off transistor thus tending to bias the off transistor into conduction. The switching of the transistors $Q_1$ and $Q_2$ is controlled by the commutator transformer $T_c$ and the resonant circuit comprising inductance L and capacitor $C_2$.

The method of feedback incorporated in the arrangement of $Q_1$, $Q_2$ and the transformer $T_f$, is known as current feedback because the current fed into the bases of $Q_1$ and $Q_2$, respectively, are proportional to the current in the primary windings $N_{fp1}$ and $N_{fp2}$, respectively, and the magnitude of these currents, in turn, are proportional to the load current. In the present invention all these currents are constrained by the resonant circuit, L and $C_2$, to have one particular frequency and to have a sinusoidal waveform.

Let it be assumed that between times $T_1$ and $T_2$ that transistor $Q_1$ is off and transistor $Q_2$ is conducting. Under such conditions, the collector-emitter voltage, the collector-emitter current and the base emitter current of transistor $Q_1$ are as shown in FIG. 2 waveforms $a,b,c$. Since transistor $Q_2$ is conducting, current flows from the source $E_t$ through winding $N_{c2}$ of commutator transformer $T_c$, the primary winding $N_{p2}$ of load transformer $T_L$, the primary winding $N_{fp2}$ of the feedback transformer $T_f$ and the collector-emitter circuit of transistor $Q_2$ to the negative terminal of source $E_t$. Current also flows from terminal 1 to terminal 2 of winding $N_{c1}$, through the resonant circuit to primary winding $N_{p2}$ of the load transformer. Because of the small losses in the resonant circuit, slightly less than half of the current passes through the resonant circuit, the remainder passing directly through winding $N_{c2}$ and winding $N_{p2}$ to the primary winding $N_{fp2}$ of the feedback transformer $T_f$.

At $T_1$ the voltages on inductor L and capacitor $C_2$ are as in FIG. 2 waveform (f) with polarity as indicated in FIG. 1. As current begins to flow between terminals 1 and 2 of winding $N_{c1}$ and through the resonant circuit, capacitor $C_2$ charges and the stored energy in inductor L discharges. The voltage on capacitor $C_2$ rises sinusoidally and reaches zero voltage at the mid-point of the period $T_1$ to $T_2$. Simultaneously the voltage on inductor L falls and reaches zero at the same instant. Also, at $T_1$ the voltage of terminal 1 to terminal 2 on transformer $T_c$ is at its negative peak value, essentially equal in magnitude to the source voltage $E_t$. As the voltages on capacitor $C_2$ and inductor L move sinusoidally toward zero level at the mid-point of the period $T_1$ to $T_2$, the voltage 1 to 2 of transformer $T_c$ rises sinusoidally and reaches zero at the same instant, as indicated in waveform (e) of FIG. 1. At this instant, the voltage across the parallel combination of transformer $T_c$ and the resonant circuit L and $C_2$ is practically zero, and since $Q_2$ is turned on during this period $T_1$ to $T_2$, the source voltage $E_t$ appears almost undiminished across terminals 3 to 4 on winding $N_{p2}$ of transformer $T_L$. Therefore, at this instant, the inverse of this voltage appears across terminals 1 to 2 of winding $N_{p1}$ of transformer $T_L$ as indicated in waveform (d) of FIG. 1. The negative peak of the voltage 1 to 2 on transformer $T_L$ indicates that the current from the source $E_t$ through the parallel combination of the transformer $T_c$ and the resonant circuit, L and $C_2$ in series with the winding 3 to 4 on transformer $T_L$ and with winding $N_{fp2}$ on transformer $T_f$ and with the transistor, $Q_2$, is at its peak. This current continues to flow in the same direction through the same circuit but with diminishing levels for the remaining half of the period $T_1$ to $T_2$. The part of this current that flows through winding $N_{c1}$ of transformer $T_c$ continues to charge capacitor $C_2$ so that the voltage across $C_2$ rises sinusoidally from zero to its positive peak at time $T_2$. The same partial current also energizes inductor L sinusoidally so that the voltage on L falls from zero towards its negative peak at time $T_2$. At this time, the voltages and stored energies of inductor L and capacitor $C_2$ being at their peaks, the charging current that produced these voltages, namely the current from the source, $E_t$, through winding $N_{c1}$ of transformer $T_c$, is constrained to zero. The turns ratio, $N_{c1}$ to $N_{c2}$, of transformer $T_c$ is one-to-one and the currents in these two windings are almost equal. Therefore, at time $T_2$ the current from the source $E_t$ is reduced to zero. The general result, for the period $T_1$ to $T_2$, due to the nature of the resonant circuit, L and $C_2$, which will allow only sinusoidal currents to flow through transformer $T_c$, is that only sinusoidal current can flow through winding $N_{p2}$ of transformer $T_L$. As indicated by the voltage 1 to 2 on transformer $T_L$, waveform (d) of FIG. 1, this current is essentially zero at times $T_1$ and $T_2$ and has its peak at the mid-point of the period $T_1$ to $T_2$. Because of the method of current feedback through the transformer $T_f$, the current fed into the base of transistor $Q_2$ is zero at time $T_1$ and is rising so as to turn $Q_2$ on. This base current reaches its peak mid-way between times $T_1$ and $T_2$ because the collector current of $Q_2$ has its peak at that time. The base current of $Q_2$ is again zero at time $T_2$ and is falling so as to turn $Q_2$ off. Because of the polarities of the windings on the feedback transformer, $T_f$, transistor $Q_1$ is turned off as transistor $Q_2$ is turned on and transistor $Q_1$ is turned on as transistor $Q_2$ is turned off. As described earlier, this alternate switching action is aided, and at start-up is initiated by resistors $R_1$ and $R_2$.

Between the times $T_2$ and $T_3$ transistor $Q_2$ is off and transistor $Q_1$ is conducting. During this time current flows from source $E_t$ through winding $N_{c1}$ of transformer $T_c$, winding $N_{p1}$ of load transformer $T_L$, the primary winding $N_{fp2}$ of the feedback transformer $T_f$ and the collector-emitter circuit of transistor $Q_1$ to the negative terminal of source $E_t$. Almost an equal current also flows from terminal 4 to terminal 3 of winding $N_{c2}$, through the resonant circuit to the primary winding $N_{p2}$ of the load transformer. The behavior of the circuit is otherwise similar to the behavior during the period $T_1$ to $T_2$ except that, with reference to the polarities indicated in FIG. 1, the capacitor $C_2$ is being discharged and the inductor L is being charged, and the voltages on the commutator transformer $T_c$ have the opposite polarity. The collector and base current of $Q_1$ are sinusoidal and the voltages and currents in the load transformer are again sinusoidal but have the opposite polarity compared to the period $T_1$ and $T_2$. It should be noted that the action of the commutator transformer $T_c$ and the resonant circuit cause the collector currents of transistors $Q_1$ and $Q_2$ to be essentially zero at the actual switching times.

In the above manner, the resonant circuit and the commutator transformer operate to periodically switch the conducting states of transistors $Q_1$ and $Q_2$ to provide an ac waveform through the load transformer.

Further, the voltages across the load transformer $T_L$ and the currents through $T_L$ and through the resonant circuit are sinusoidal. The commutator transformer $T_c$ supports the difference between the square wave and the sine wave of the fundamental or resonant frequency. That is, it supports all the voltages of harmonic frequencies except the resonant frequency determined by the resonant circuit. The combination of the commutator transformer and the resonant circuit inhibits the harmonic currents almost completely and allows only sine wave current to flow in the primary of the load transformer. Although the collector voltages of transistors $Q_1$ and $Q_2$ appear as a square wave, the collector current is sinusoidal and is essentially zero at the instance of switching so that dissipative transients in the transistors on switching are almost negligible. This lack of switching power transients and of power at harmonic frequencies results in an inverter exhibiting high efficiency and low electromagnetic interference.

Additional frequency stability can be obtained by using a step-up transformer as the load transformer $T_L$. The load circuit resistance as seen on the primary side of the load transformer is directly proportional to the turns ratio $(n_p/n_s)^2$ where $n_p$ is the number of turns on the primary side of the load transformer while $n_s$ is the number of turns on the secondary side of the load transformer. Thus, if $n_s$ is much larger than $n_p$, the effect of the load resistance on the resonant frequency becomes minimal. Thus, by properly selecting the turns ratio of the load transformer, isolation of the resonant circuit from the load can be increased. Increased isolation provides for greater independence of the resonant frequency from load changes.

The inverter described above has a sine wave output, a stable frequency and an efficiency on the order of 90 percent. The inverter will find application in sine wave power distribution systems requiring much less filtering, shielding, twisting and routing of cables. The use of this sine wave inverter in power distribution systems should make rectifier power supplies and motors operate more efficiently and generate less electromagnetic interference.

While the invention has been particularly shown and described with reference to a preferred embodiment thereof, it will be understood by those skilled in the art that various changes in form and details may be made therein without departing from the spirit and scope of the invention.

What is claimed is:

1. A dc to ac sinewave power inverter including a source of dc potential, a load transformer and electrically operable switching means connected between the primary side of the load transformer and the dc source for periodically inverting the signal produced by said dc source and passing through said primary side the improvement comprising:
   a. a commutator transformer, and
   b. a resonant circuit coupled to said commutator transformer, said commutator transformer and resonant circuit being coupled to the primary side of said load transformer for periodically causing said switching means to switch;
   c. said switching means including a feedback transformer and switching elements, said switching elements being responsive to the operation of said commutator transformer and resonant circuit through said feedback transformer.

2. The inverter of claim 1 wherein said commutator transformer includes first and second series connected windings, said resonant circuit being coupled in parallel across said series connected commutator transformer first and second windings.

3. The inverter of claim 2 wherein one terminal of said dc source is connected to the common terminal of said first and second windings the other terminal of said dc source being connected to said switching elements.

4. The inverter of claim 3 wherein said load transformer comprises first and second primary windings serially connected to said series connected first and second winding and at least one secondary winding said feedback transformer comprising first and second primary windings serially connected respectively to said first and second primary windings of said load transformer and first and second secondary windings, said switching means comprising first and second transistors the conducting states of said first and second transistors being controlled respectively by the current in said first and second feedback transformer secondary windings.

5. The inverter of claim 4 wherein said first and second transistors each include a control electrode and first and second additional electrodes, said secondary windings of the feedback transformer being connected respectively between the control electrode and the first additional electrode of each of said transistor, said primary windings of the feedback transformer being connected respectively between the second additional electrode of said transistors and the first and second primary windings of said load transformer, said other terminal of said dc source being connected to said first additional terminals of said transistors.

6. The inverter of claim 5 wherein said load transformer is a step-up transformer.

7. A dc to ac inverter of the type including a resonant circuit for determining the frequency of the ac waveform comprising:
   a. dc power supply
   b. a load transformer having a primary and secondary side and receiving signals from said power supply
   c. switching means for periodically inverting the signals from said power supply applied to the load transformer d. a commutator transformer comprising series connected first and second windings, e. a resonant circuit connected in parallel with said series connected first and second windings, f. said commutator transformer and resonant circuit being connected between the primary side of the load transformer and the said power supply, said switching means being responsive to the operation of said commutator transformer and resonant circuit for switching the direction of current flow in said load transformer.

8. The inverter of claim 7 wherein said switching means comprises feedback transformer and first and second switching transistors comprising a control electrode and first and second additional electrodes.

9. The inverter of claim 8 wherein said feedback transformer comprises first and second primary windings serially connected to the primary side of said load transformer and first and second secondary windings connected respectively between the control electrode and the first additional electrode of said switching transistors.

10. The inverter of claim 9 wherein said load transformer is a step up transformer including first and second primary windings and a plurality of secondary windings said resonant circuit being serially connected between said first and second load transformer primary windings; one terminal of said power supply being connected to the common terminal of said first and second commutator transformer windings the other terminal of said power supply being connected to the first additional terminals of said switching transistors, said second additional terminals of said transistors being connected respectively to said first and second feedback transformer primary windings.

* * * * *